US006848055B1

(12) United States Patent
Yarch

(10) Patent No.: US 6,848,055 B1
(45) Date of Patent: Jan. 25, 2005

(54) INTEGRATED CIRCUIT HAVING VARIOUS OPERATIONAL MODES AND A METHOD THEREFOR

(75) Inventor: Mark A. Yarch, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/535,474

(22) Filed: Mar. 23, 2000

(51) Int. Cl.[7] .............................................. G06F 1/28
(52) U.S. Cl. ...................... 713/300; 713/310
(58) Field of Search ................. 713/300, 320, 713/322, 323, 324, 310

(56) References Cited

U.S. PATENT DOCUMENTS

| 5,148,546 A | * | 9/1992 | Blodgett | 713/320 |
| 5,495,617 A | * | 2/1996 | Yamada | 713/323 |
| 5,758,175 A | * | 5/1998 | Fung | 713/323 |
| 5,778,237 A | * | 7/1998 | Yamamoto et al. | 713/322 |
| 5,954,820 A | * | 9/1999 | Hetzler | 713/323 |
| 6,341,354 B1 | * | 1/2002 | Lee | 713/324 |

FOREIGN PATENT DOCUMENTS

EP          539884 A1 *  5/1993  ............. G06F/1/32

OTHER PUBLICATIONS

Russ Hersch—"Embedded Processor and Microcontroller primer and FAQ"—Oct. 29, 1995—Newsgroups: comp.arch.embedded, comp.robotics, comp.sys.intel, sci.electronics, alt.hardware.homebuilt, comp.answers, sci.answers, alt.answers.*

Steven Murray—"Re: Distributing between logic state and tri state"—Jun. 4, 1991—Newsgroups: sci.electronics.*

* cited by examiner

*Primary Examiner*—Lynne H. Browne
*Assistant Examiner*—Thuan Du
(74) *Attorney, Agent, or Firm*—Kenneth M. Seddon

(57) ABSTRACT

Briefly, in accordance with one embodiment of the invention, an integrated circuit has two voltage domain regions. The integrated circuit provides for changing the operational voltage of one of the voltage domain regions with respect to the other.

17 Claims, 4 Drawing Sheets

INTEGRATED CIRCUIT HAVING VARIOUS OPERATIONAL MODES AND A METHOD THEREFOR

BACKGROUND

In portable devices, such as communication devices, portable computers, and the like, the power for the device is provided with a battery. Thus, the effectiveness of a portable device may be determined in part by the length of time that the battery can provide power to the device, which is generally proportional to the amount of current that is consumed by the device while in operation.

Conventional techniques to improve the lifetime of batteries have focused on increasing the size or storage capacity of the battery. However, such techniques are either very costly, or increase the size of the battery to the point where the portability of the device may be hampered. Thus, there is a continuing need for better ways to improve the lifetime and power consumption of portable devices.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
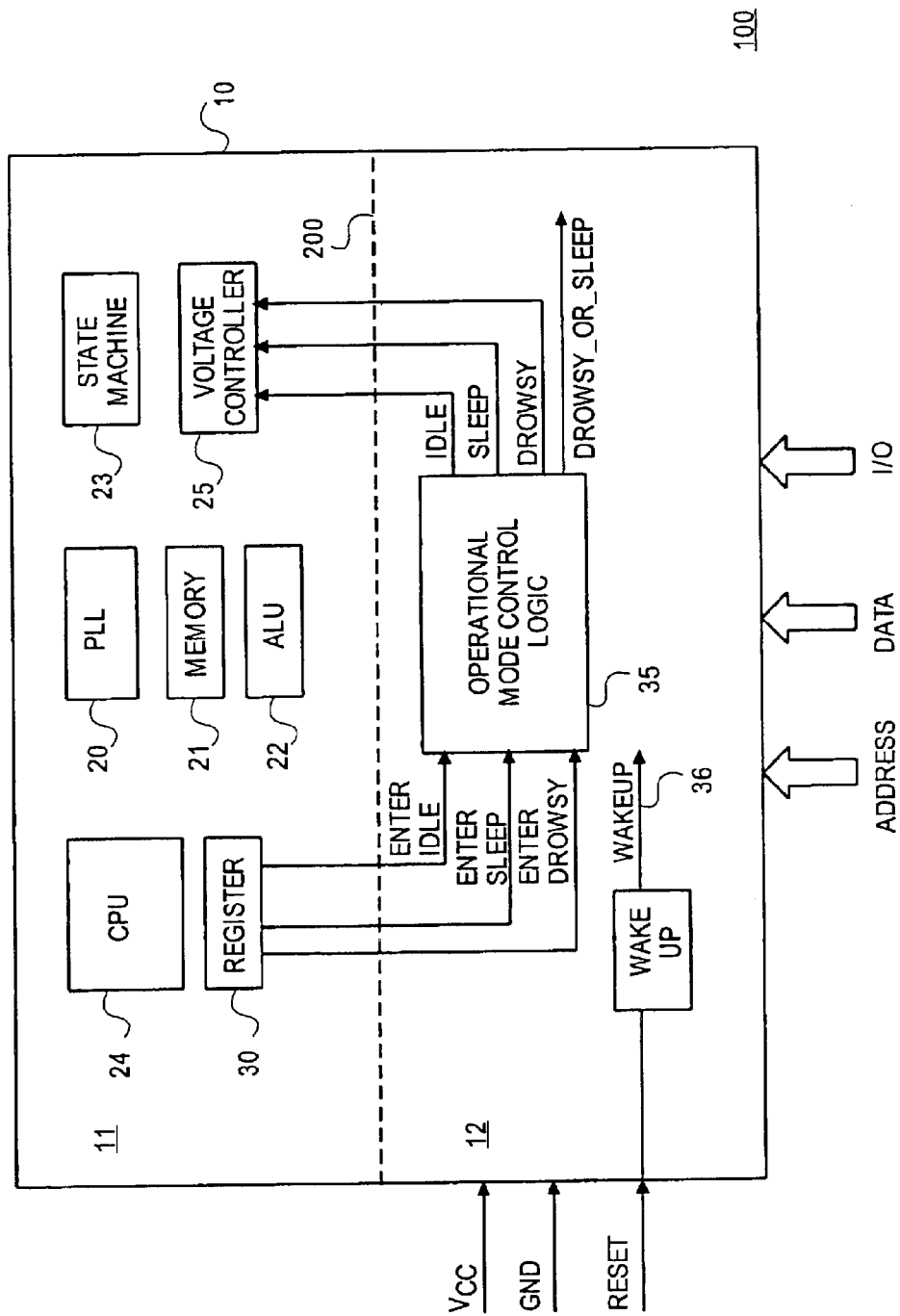
FIG. 1 is a block diagram representation of an embodiment of an integrated circuit in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing" or "computing" or calculating" or "determining" or the like, refer to the action and processes of a computer or computing system, or similar electronic computing device, that manipulate and transform data represented as physical, such as electronic, quantities within the computing system's registers and/or memories into other data similarly represented as physical quantities within the computing system's memories, registers or other such information storage, transmission or display devices.

Turning to FIG. 1, an embodiment 100 in accordance with the present invention is described. Embodiment 100 may comprise a portable device such as a mobile communication device (e.g., cell phone), a portable computer, or the like. Although it should be understood that the scope of the present invention is in no way limited to these applications.

Embodiment 100 includes an integrated circuit 10 that may be, for example, a microprocessor, a digital signal processor, a microcontroller, or the like. However, it should be understood that the scope of the present invention is not limited to these examples. When integrated circuit 10 is in operation, logic circuits and other digital electronic components within integrated circuit 10 that are powered (i.e., have a power supply and ground voltage potential applied to them) not only consume power due to their normal operation, but may also consume power due to leakage currents. Accordingly, the power consumption of integrated circuit 10 may be reduced not only by reducing operational current consumption, but by reducing leakage current as well. In accordance with embodiments of the present invention, this may be achieved, at least in part, by lowering the operational voltage range of a portion of integrated circuit 10 when that portion is not in use. This in turn, may result in the leakage current being proportionately reduced.

However, the operational voltage range of portions of integrated circuit 10 may not be reduced in an indiscriminate manner. Reducing the operational voltage range of a portion of an integrated circuit may have an impact other portions of the integrated circuit that are still in operation at the normal operational voltage range. For example, if integrated circuit 10 provides control or data signals to other integrated circuits within the portable device, it may be desirable to maintain the logic circuits and other digital electronic components of integrated circuit 10 that provide the signals at normal operational voltage levels.

As shown in FIG. 1, in this particular embodiment, integrated circuit is divided into at least two portions, here into 11 and 12 by a dashed line 200. Dashed line 200 does not necessarily represent any physical delineation within integrated circuit 10. As explained in more detail hereinafter, dashed line 200 is used to demarcate different voltage domain regions within integrated circuit 10 that may each have different operating voltage ranges in accordance with embodiments of the present invention.

As shown, voltage domain region 11 may include logic circuits or other circuits such as a phase locked loop (PLL) 20, memory or memories 21, an arithmetic logic unit (ALU) 22, a processor or central processing unit (CPU) 24, and a state machine 23, as examples. Further, memory 21 may comprise static, dynamic, or non-volatile memory that may store data and instructions used by integrated circuit 10. For example, memory 21 may be a static random access memory (SRAM), a dynamic random access memory (DRAM), or a flash memory). The sub-circuits that make up voltage domain region 11 may be referred to as "core logic" or "core $V_{cc}$ logic" by those skilled in the art. It should be understood that the scope of the present invention is not limited by the type of memory within integrated circuit 10 or the circuits within a voltage domain region.

In this particular embodiment, voltage domain region 11 includes the majority of circuits within integrated circuit 10. This is only intended as an illustration to demonstrate how integrated circuit 10 may appreciate benefits of the present invention by reducing the operational voltage range of a large number of transistors. However, it should be understood that alternative embodiments of the present invention need not include all or any of the circuits shown in FIG. 1, and moreover, may only include one or a few.

Although the scope of the present invention is not limited in this respect, a voltage domain region 12 may represent the pad output circuits of integrated circuit 10. As shown in FIG. 1, voltage domain region 12 includes the sub-circuits and pads that receive or provide the power supply and operational signals (e.g., address, data, control, input/output (I/O), and the like) to and from integrated circuit 10. Although not intended as a limitation of the present invention, voltage domain region 12 may also include an operational mode control logic circuit 35 that may determine, at least in part, the operational mode of integrated circuit 10. For example, operational mode control logic 35 may determine when integrated circuit 10 is to enter into an idle, sleep, or drowsy mode. In each of these modes, the operational voltage and functional operation of the logic circuits within voltage domain region 11 may be different.

The drowsy mode may be used to suspend the operation of the core logic circuits and PLL within voltage domain region 11. Once suspended, the operational voltage may be reduced to conserve power. However, the drowsy mode allows the operation to continue at a later time by permitting the logic circuits within voltage domain region 11 to retain their value. The idle mode is similar to the drowsy mode, however, the PLL of the voltage domain region is left running to provide for a faster recovery time.

A sleep mode may be desired for situations where the operation of the core logic circuits and PLL within voltage domain region 11 is not only suspended, but the state of any logic circuit is lost. This may result in greater power savings. Table 1 is provided below to give a brief summary of various operational modes that may optionally be used in conjunction 5 with embodiments of the present invention. It should also be understood that the scope of the present invention is not limited to these modes.

TABLE 1

| Mode | PLL | Retention of values | Core Logic $V_{cc}$ |
| --- | --- | --- | --- |
| Idle | On | Yes | $V_{cc}$ |
| Drowsy | Off | Yes | $<V_{dd}$ |
| Sleep | Off | No | 0 |

In the particular embodiment shown in FIG. 1, the process of changing or reducing the operational voltage range of at least a portion of integrated circuit 10 begins with a software/firmware instruction. For example, CPU 24 may execute an instruction provided externally or stored within memory 21 that calls for integrated circuit 10 to enter into a different operational mode (e.g., one of the modes shown in Table 1). Although not intended as a limitation of the scope of the present invention, the execution of instructions may be halted contemporaneous with changing the operational voltage of voltage domain region 11.

In this embodiment, upon encountering a mode-change instruction, a control signal is generated to indicate which mode integrated circuit 10 is to enter. These signals are labeled in FIG. 1 as ENTER_IDLE, ENTER_SLEEP, or ENTER_DROWSY, respectively. This may be done, for example, by setting a bit within a register 30. Of course the invention is not limited in scope in this respect. This may be accomplished any one of a number of ways, for example, this control signal may also be provided externally or be generated from a state machine in voltage domain region 11 or 12.

Operational mode control logic 35 may then generate control signals that change the operational voltage range of voltage domain region 11 with respect to the operational voltage range of voltage domain region 12. In this embodiment, operational mode control logic 35 generates the appropriate signal (labeled, IDLE, SLEEP, and DROWSY, respectively) depending on the operational mode that integrated circuit 10 is to enter. Each of these signals may result in voltage controller 25 changing the operational voltage range of voltage domain region 11 to a predetermined smaller range.

Figure 3:
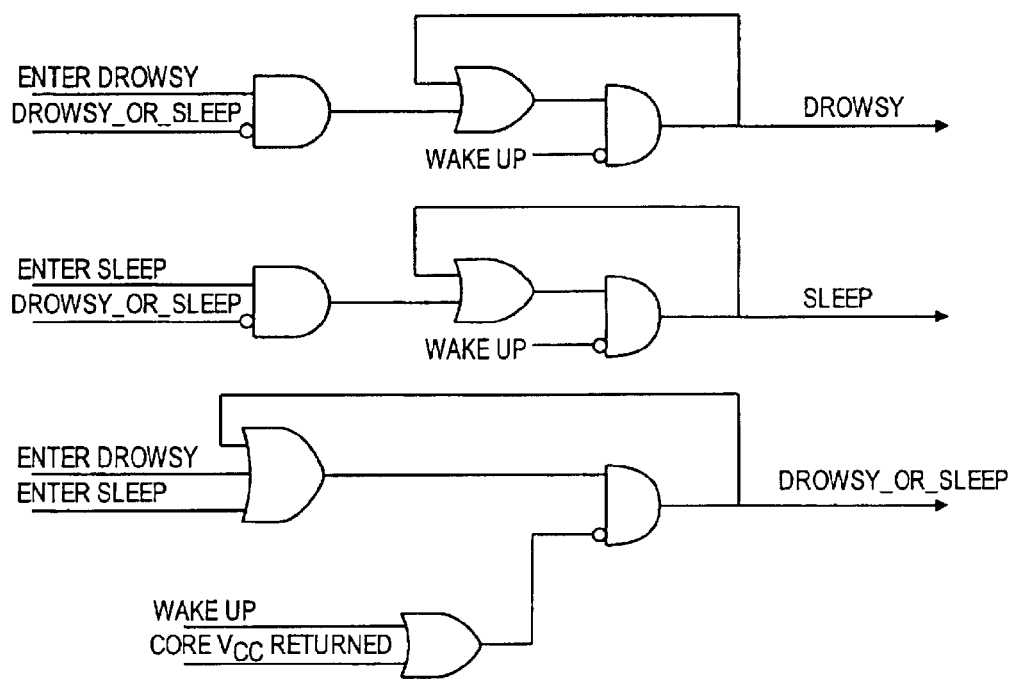
FIG. 3 is a schematic representation of some control logic in accordance with an embodiment of the present invention.

FIG. 3 is provided to illustrate just one embodiment of a technique for generating the DROWSY, SLEEP, and DROWSY_OR_SLEEP signals by operational mode control logic 35 (see FIG. 1). It should be understood that the present invention is not limited to these circuits as the control signals may be generated in a variety of ways. As shown, ENTER_SLEEP and ENTER_DROWSY are gated with the DROWSY_OR_SLEEP signal to ensure that integrated circuit 10 does not unintentionally change between the modes while it is already in one of the other modes.

A voltage controller 25 (see FIG. 1) responds to the control signals generated by operational mode control logic 35 by changing (e.g., lowering or raising) the operational voltage range of voltage domain region 11, accordingly. By lowering the operational voltage range of transistors with voltage domain region 11, the leakage current within voltage domain region 11 may also be reduced. In this embodiment, the operational voltage range of the sub-circuits within voltage domain region 12 remains substantially constant while the operational voltage range of the voltage domain region 11 is changed. However, it should be understood that in alternative embodiments, the operational voltage range of voltage domain region 12 may also be changed (e.g., raised or lowered).

Figure 2:
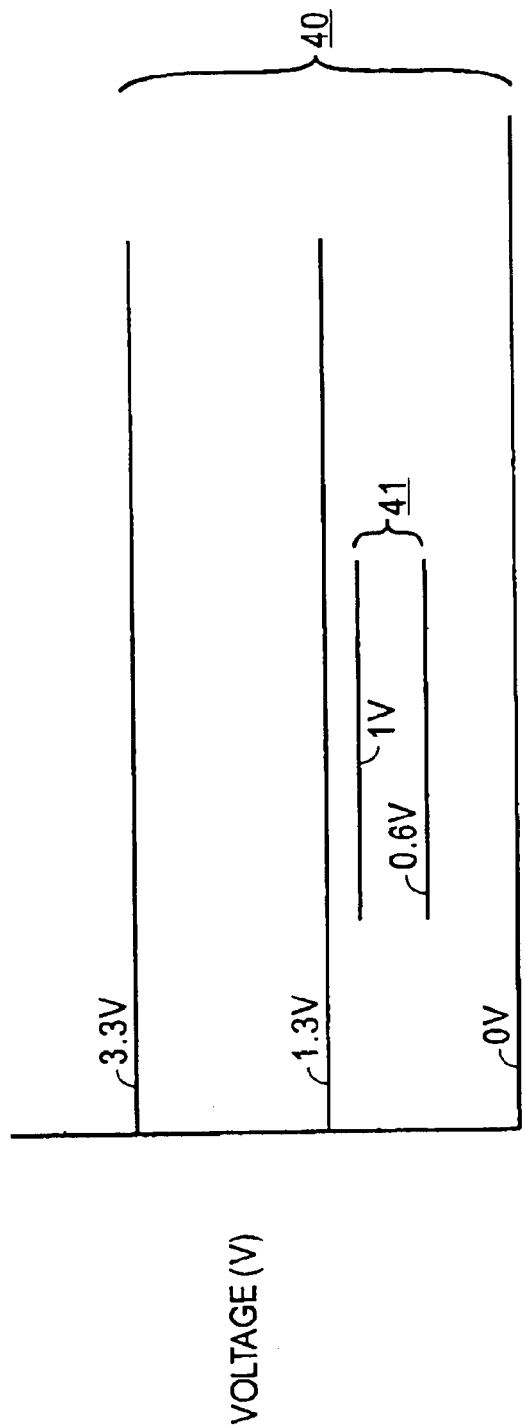
FIG. 2 is a graph illustrating voltage levels of portions of an integrated circuit in various operational modes in accordance with an embodiment of the present invention.

One effect of the change in operational voltage range of voltage domain region 11 is that signals provided by voltage domain region 11 may become logically indeterminate with respect to voltage domain region 12 of integrated circuit 10. Referring to FIG. 2, an example of how signals may become logically indeterminate in accordance with an embodiment of the present invention is provided.

During normal operation, the power supply voltage may be set to 3.3 volts (v); however, it should be understood that this is only meant to be illustrative and that the scope of the present invention is not limited in any way to this particular voltage level. Thus, in this example, the voltage level of all signals would ideally be either be 3.3 v (indicating a logic "1") or 0 v (indicating a logic "0"). However, it is expected that at least some of the signals generated within the integrated circuit may vary between these levels (indicated in FIG. 2 with a bracket 40) due to parasitic conditions. To account for this variation, if a signal has a voltage level ranging, for example, between 3.3–1.3 v, then the signal may be treated as a logic "1" and otherwise it may be treated as a logic "0."

In the embodiment shown in FIG. 2, the operational voltage range of the transistors within voltage domain region 11 may be changed, for example, so that the voltage level of the signals provided by the transistors range between 0.6 v and 1.0 v (bracket 41). For example, 1.0 v could be a logic "1" and 0.6 v may represent a logic "0."However, the operational voltage range of the transistors within voltage domain region 12 may not change and remain at 0–3.3 v. Consequently, the uppermost operational voltage level of voltage domain region 12 may be at least twice the uppermost operational voltage level of voltage domain region 11 in some modes.

Under these conditions, circuits within voltage domain region 12 may not be able to resolve the voltage level of the signals originating from voltage domain region 11 to determine the difference between a logic "1" and a logic "0." This may be due, at least in part, to the entire range of voltage levels of signals from voltage domain region 11 representing a logic "0" in the larger voltage range (bracket 40) at which voltage domain region 12 is operating. Thus, transistors and sub-circuits within voltage domain region 12 may not be able to accurately interpret logically signals that originate from voltage domain region 11 when the operational voltage range of voltage domain region 11 is changed.

Figure 4:
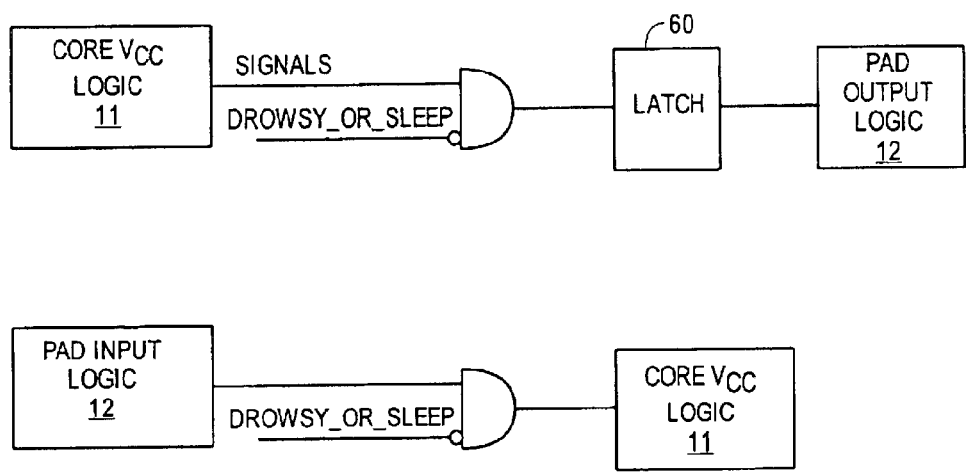
FIG. 4 is a schematic representation of some additional control logic in accordance with an alternative embodiment of the present invention.

While signals originating from voltage domain region 11 are logically indeterminate with respect to voltage domain region 12, it may be desirable to gate these signals so that they remain constant with respect to voltage domain region 12. In other words, it may be desirable to temporarily inhibit signals originating from voltage domain region 11 that are within voltage domain region 12 so that they do not change logic levels. This may prevent the logically indeterminate signals from causing unintended or unpredictable response within voltage domain region 12. As shown in FIG. 4, in alternative embodiments of the present invention, the signals originating from voltage domain region 11 (labeled as Core Vcc logic) may be gated with a DROWSY_OR_SLEEP signal. As a result, these signals with respect to voltage domain region 12 will be driven to a known state. This not only reduces the risk of misinterpretation of the signals by transistors within voltage domain region 12 (labeled pad output logic), but also keeps these signals at a static level. This may further reduce leakage currents while the signals are in the logically indeterminate state.

In addition, gating the signals provided by voltage domain region 11 may reduce the risk of signals that originate within voltage domain region 12 from changing while integrated circuit 10 is in this alternate operational mode. This, in turn, may help ensure that any signals that are provided to other integrated circuits within the portable device do not change while integrated circuit 10 is in this mode.

As shown in FIG. 4, it may also be desirable to optionally add a latch 60 that stores the last valid logic value of a signal from voltage domain region 11 before the operational voltage range of voltage domain region 11 was changed. This may be beneficial if it is desirable to allow transistors or circuits within voltage domain region 12 to continue operation using the last valid logic value of the signals originating from voltage domain region 11.

Optionally, it may also be desirable to gate the signals originating from or provided by voltage domain region 12 to voltage domain region 11 while the operational voltage range of voltage domain region 11 is changed (e.g., in the lower value). As shown in FIG. 4, the signals provided from voltage domain region 12 (Pad input logic) may also be gated with the DROWSY_OR_SLEEP signal. As a result, the signals provided by voltage domain region 12 are substantially constant at a known voltage value with respect to the transistors and logic circuits within voltage domain region 11 (labeled Core $V_{cc}$ Logic). The may be desirable to reduce the risk that the circuits within voltage domain region 11 lose their value.

As shown in FIG. 3, each of the signals generated by operational mode control logic 35 (see FIG. 1) may be gated with a WAKE UP signal. This signal may be used to cancel or negate the signal so that integrated circuit 10 returns to normal operation. As shown in FIG. 1, the WAKE UP signal may be provided by a wake up circuit 36. Wake up circuit 36 may generate the WAKE UP signal in response to an interrupt signal provided from an external source. In an alternative embodiment, wake up circuit 36 may wait a predetermined delay period before generating the WAKE UP signal to give some portions of integrated circuit 10 additional time before the operational voltage range of voltage domain region 11 is returned to its typical range. For example, it may be desirable to allow the PLL of integrated circuit 10 to re-synchronize before the WAKE UP signal is generated.

By now it should be appreciated that the present invention provides a method by which the power consumption of a device may be reduced. The present invention provides for, among other things, the use of software or firmware to adjust the operational voltage range of a portion of an integrated circuit with respect to another portion so that power consumption may be improved. The use of a software instruction to control the operational voltage range allows a programmer to better control when, and for how long, portions of an integrated circuit enter a dormant state. This may allow for more efficient use of the integrated circuit and for greater power savings.

While certain features of the invention have been illustrated and described herein, many modifications, substitutions, changes, and equivalents will now occur to those skilled in the art. It is, therefore, to be understood that the appended claims are intended Yu) to cover all such modifications and changes as fall within the true spirit of the invention.

What is claimed is:

1. A method of changing an operational voltage range of at least a portion of an integrated circuit, the method comprising:

generating a first control signal;

changing the operational voltage range of a first domain region in response to the first control signal such that voltage signals from the first voltage domain region have an indeterminate logic value with respect to an operational voltage range of a second voltage domain region of the integrated circuit; and gating at least one voltage signal generated in the first voltage domain region with the first control signal, the at least one voltage signal being provided to the second voltage domain region.

2. The method of claim 1, further comprising generating a second control signal in the first voltage domain region to indicate time at which the operational voltage range of the first domain region is to be changed, and wherein the operational voltage range of the second voltage domain region remains substantially constant while the operational voltage range of the first voltage domain region is changed.

3. The method of claim 2, wherein generating the second control signal includes executing a software instruction to set a bit In a register in the integrated circuit.

4. The method of claim 1, wherein the integrated circuit comprises a plurality of signal pads in the second voltage domain region, and the method further comprises:

gating at least one of the plurality of signal pads so that the voltage signal provided by the at least one of the plurality of signal pads has a substantially constant voltage while the operational voltage range of the first voltage domain region is changed.

5. The method of claim 2, wherein generating the first control signal includes generating the first control signal in the second voltage domain region in response to the second control signal.

6. The method of claim 1, wherein the integrated circuit includes a voltage controller, and changing the operational voltage range of the first voltage domain region includes changing the operational voltage range of the first voltage domain region of the integrated circuit with the voltage controller.

7. The method of claim 1, and further comprising gating at least one voltage signal generated in the second domain region with the first control signal, the at least one voltage signal being provided to the first voltage domain region.

8. The method of claim 1, and further comprising halting the execution of instructions substantially contemporaneously with generating the first control signal.

9. The method of claim 1, and further comprising:

generating a wakeup signal;

negating the first control signal; and changing the operational voltage range of the first domain region such that voltage signals from the first voltage domain region are logically determinate with respect to the second voltage domain region of the integrated circuit.

10. The method of claim 1, wherein changing the operational voltage range of the first voltage domain region includes lowering the operational voltage range of the first voltage domain region so that a power supply voltage level of the second voltage domain region is at least twice that of a power supply voltage level of the first voltage domain region.

11. A method of operating an integrated circuit, the method comprising:

halting the execution of instructions in a first voltage domain region of the integrated circuit;

generating an operational mode control signal in the first voltage domain region of the integrated circuit;

generating an operational mode status signal in a second voltage domain region of the integrated circuit;

lowering the operational voltage range of the first voltage domain region with respect to the operational voltage range of the second voltage domain region;

gating a first set of voltage signals originating from the first voltage domain region with the operational mode status signal so that the first set of voltage signals have substantially constant voltage level; and gating a second set of voltage signals originating from the second voltage domain region with the operational mode status signal so the second set of signals have substantially constant voltage level.

12. The method of claim 11, wherein lowering the operational voltage range includes lowering the operational voltage range of the first voltage domain region so that at least some of the voltage signals in the first voltage domain region are logically indeterminate with respect to the operational voltage range of the second voltage domain region.

13. The method of claim 11, and further comprising:

generating a wake-up signal in the second voltage domain region;

raising the operational voltage range of the first voltage domain region; and resuming the execution of instructions in the first voltage domain region of the integrated circuit.

14. An integrated circuit having a first portion having a first operational voltage range and a second portion having a second operational voltage range, the integrated circuit comprising:

a circuit adapted to indicate an operational mode of the integrated circuit;

a voltage controller coupled to the first portion of the integrated circuit, wherein the voltage controller is adapted to change the operational voltage range of the first portion of the integrated circuit such that the operational voltage range of the first portion is smaller than the operational voltage range of the second portion of the integrated circuit; and a gating device adapted to maintain voltage signals in the first portion of the integrated circuit at a substantially constant voltage level.

15. The integrated circuit of claim 14, wherein the voltage controller is further adapted to change the operational voltage range of the first portion of the integrated circuit so that the operational voltage of the second portion is at least twice that of the operational voltage range of the first portion of the integrated circuit.

16. The integrated circuit of claim 14, wherein the voltage controller is further adapted to change the operational voltage range of the first portion of the integrated circuit so that a voltage signal is logically indeterminate with respect to the operational voltage range of the second portion of the integrated circuit.

17. The integrated circuit of claim 14, and further comprising a gating device adapted to maintain voltage signals in the second portion of the integrated circuit at a substantially constant voltage level.

* * * * *

UNITED STATES PATENT AND TRADEMARK OFFICE
CERTIFICATE OF CORRECTION

PATENT NO. : 6,848,055 B1
DATED : January 25, 2005
INVENTOR(S) : Yarch

It is certified that error appears in the above-identified patent and that said Letters Patent is hereby corrected as shown below:

Column 3,
Line 64, delete "5".

Column 5,
Line 36, delete "O.", and insert -- "0." --

Column 6,
Line 60, delete "Yu)".

Signed and Sealed this

Third Day of May, 2005

JON W. DUDAS
*Director of the United States Patent and Trademark Office*